UNITED STATES PATENT OFFICE.

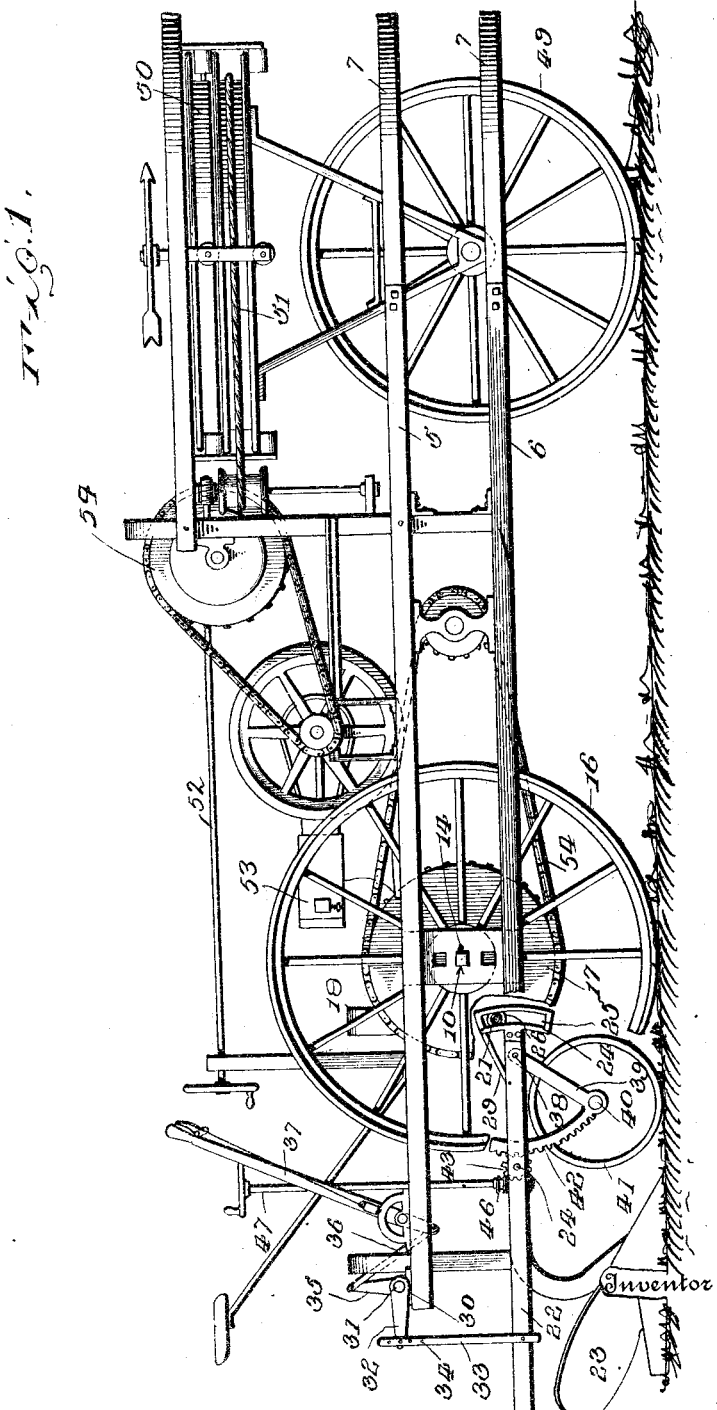

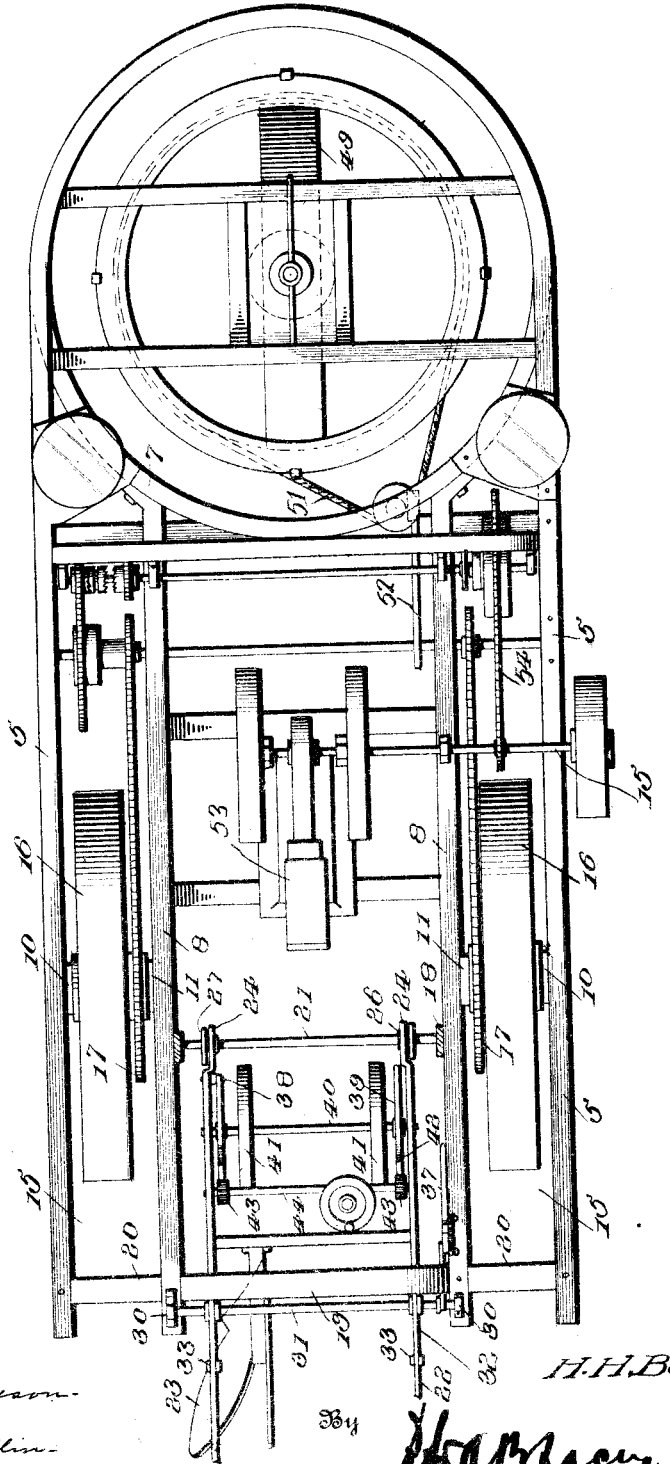

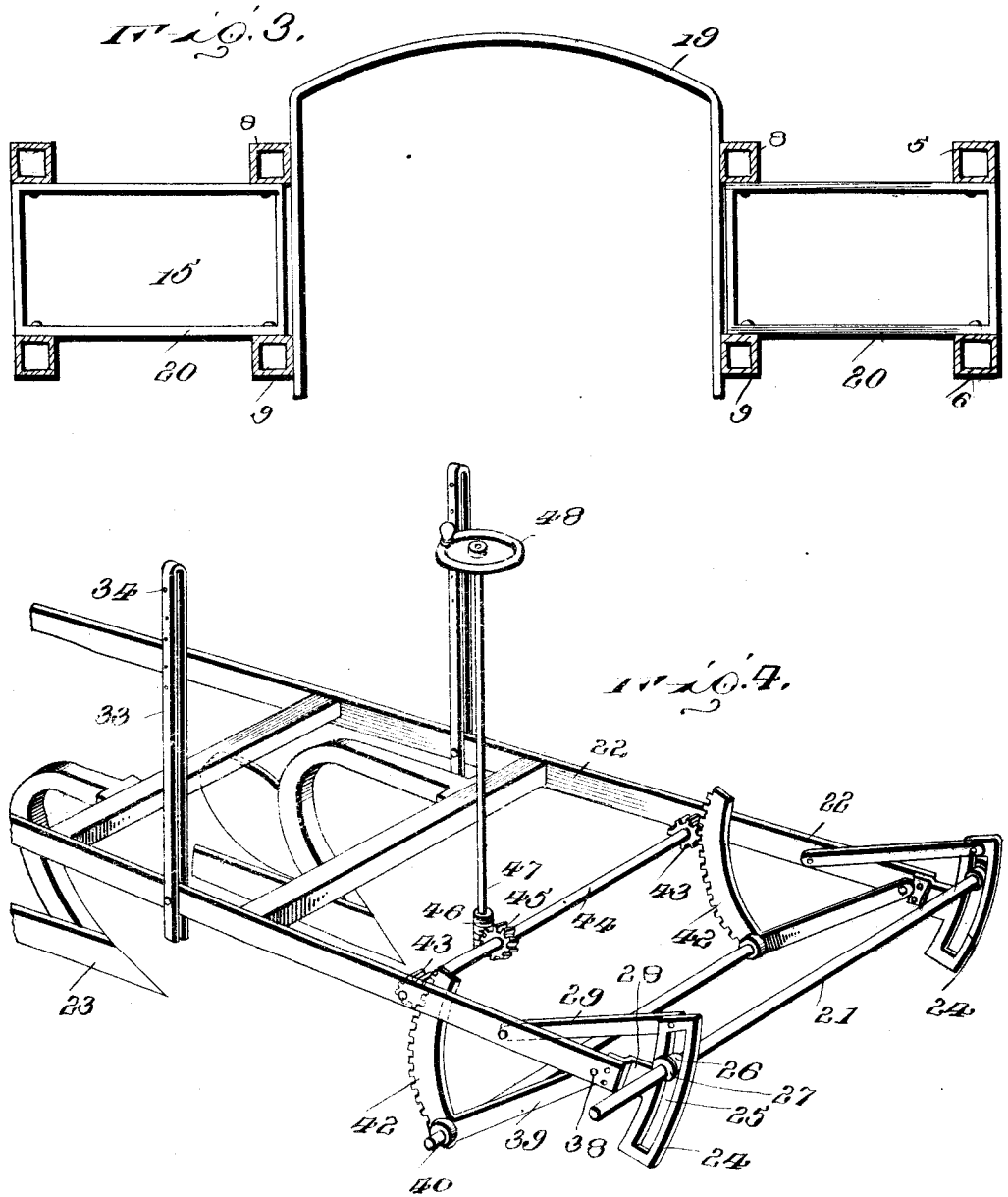

HENRY H. BOENKER, OF ST. CHARLES, MISSOURI.

AGRICULTURAL IMPLEMENT.

1,051,801. Specification of Letters Patent. Patented Jan. 28, 1913.

Application filed December 8, 1910. Serial No. 596,303.

*To all whom it may concern:*

Be it known that I, HENRY H. BOENKER, citizen of the United States, residing at St. Charles, in the county of St. Charles and State of Missouri, have invented certain new and useful Improvements in Agricultural Implements, of which the following is a specification.

This invention relates to agricultural machinery and more particularly to a mechanically propelled plow for tilling the soil preparatory to planting.

The object of the invention is to provide a motor plow including a main frame having a draw bar or rod mounted on the rear end thereof and to which is operatively connected a freely movable auxiliary plow carrying frame, means being provided for raising and lowering the auxiliary frame, thereby to regulate the depth of penetration of the plow into the soil.

A further object is to provide a plow carrying frame, the construction of which is such that the rear end thereof is free to move in a vertical plane in case the guide wheels at the forward end of the frame should enter a rut or hole in the ground.

A further object is to provide the main frame with vertically adjustable stub axles so that the traction wheels thereof may be raised or lowered independently of each other, thereby to level the machine, as for instance, when one of the traction wheels is traveling in a furrow.

A further object is to provide the main frame with an auxiliary frame or yoke which spans the plow carrying frame and forms a combined guide and rub iron for said plow carrying frame.

A still further object of the invention is generally to improve this class of machinery so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawings, in which:

Figure 1 is a side elevation partly in section of a motor plow constructed in accordance with my invention; Fig. 2 is a top plan view; Fig. 3 is a transverse sectional view, showing the construction of the rear yoke of the main frame; Fig. 4 is a perspective view of the plow carrying frame and its associated parts detached.

Corresponding and like parts are referred to in the following description and indicated in all the views of the drawings by the same reference characters.

The improved motor driven plow forming the subject matter of the present invention comprises a main frame including superposed parallel outer side bars 5 and 6 preferably formed of tubing and having their forward ends riveted or otherwise rigidly secured to annular reinforcing members or rings 7 constituting the front end of the machine.

Spaced from the outer side bars 5 and 6 are inner side bars 8 and 9 also formed of tubing and having their forward ends rigidly secured to the adjacent annular members or rings 7. The outer side bars 5 and 6 are connected by vertically disposed bearing blocks 10, there being similar bearing blocks 11 connecting the inner side bars 8 and 9, said bearing blocks being provided with a vertical row of openings 12 disposed in transverse alinement and adapted to receive stub axles, indicated at 13. The intermediate portions of the stub axles 13 are cylindrical in cross section, while the opposite ends thereof are provided with squared terminals 14 having openings formed therein for the reception of cotter pins or similar fastening devices, thereby to prevent rotation of said stub axles.

The inner and outer side bars of the main frame are spaced apart to form compartments 15 adapted to accommodate traction wheels 16, said traction wheels being loosely mounted on the stub axles and each provided with a sprocket wheel 17.

It will be here noted that the traction wheels 16 are independently mounted on the stub axles, the latter being adjustable vertically of the frame so as to permit either wheel to be raised or lowered independently of the other to level the machine, as for instance, when one of the traction wheels is traveling in a furrow.

Interposed between the inner side bars 8 and 9 of the main frame, are inverted U-shaped auxiliary frames or yokes 18 and 19, the opposite legs of the yoke 18 being spaced inwardly from the rear end of the main frame and rigidly secured to the adjacent inner side bars 8 and 9, and the legs of the yoke 19 being disposed at the extreme rear end of the truck, as shown.

Rigidly secured to the opposite legs of the yoke 19, are substantially rectangular connecting frames 20, which latter extend transversely across the compartments 15 and are rigidly secured to the inner and outer side bars, thus to properly space said bars and at the same time secure the several parts in assembled position.

The opposite legs of the yoke 18 are formed with transversely alined openings in which is seated a transverse rod 21, the latter constituting a draw bar for the plow carrying frame, indicated at 22. The rear end of the frame 22 is closed, while the front end thereof extends between the inner side bars 8 and 9 for attachment to the draw bar 21, there being suitable supports secured to the frame 22 for the plow shares 23, any number of which may be used.

Secured to the inner ends of the side bars constituting the plow carrying frame 22, are segmental plates 24 having arcuate slots 25 formed therein to permit the passage of the rod or draw bar 21, there being suitable rollers 26 mounted on the opposite ends of the draw bar at the slots 25 and provided with flanges 27 which bear against the outer faces of the segmental plates 24 so as to assist in preventing lateral movement of the plow carrying frame.

The segmental plates 24 are provided with reduced shanks 28, preferably offset with respect to the plates 24 and having their ends bolted or otherwise rigidly secured to the adjacent portion of the plow carrying frame 22. The segmental plates 24 are connected to the side bars of the plow carrying frame by inclined braces 29, which braces serve to reinforce and strengthen said frame.

It will here be noted that the plow carrying frame 22 is free to move vertically of the main supporting frame or truck so as to conform to any inequalities on the surface of the ground and also to permit the plow carrying frame to be adjusted vertically of the truck so as to regulate the depth of penetration of the plow shares into the soil. It will also be noted that the plow carrying frame 22 is pivotally mounted on the lower ends of the hangers 33 so that the plow carrying frame is free to move vertically with the pivotal connection between the frame and hangers 33 as a center, the arcuate slots 25 permitting tilting movement of the front end of the plow carrying frame without binding or wedging action between the parts.

Secured to the inner side bars 9 are brackets 30 in which is journaled a transverse shaft 31 having oppositely disposed crank arms 32 for engagement with suitable hangers 33. The hangers 33 embrace the side bars of the plow carrying frame 22 and are preferably provided with a series of vertical openings 34 adapted to receive a transverse pin, which latter in turn engages the adjacent crank arm 32. An auxiliary arm 35 is secured to the shaft 31 and is connected through the medium of a link 36 with an operating lever 37, so that by tilting the lever 37 on its pivotal axis, the rear end of the plow carrying frame may be raised or lowered.

Pivotally mounted at 38 on the side bars of the plow carrying frame, are depending brackets 39 in which is journaled a shaft 40 carrying spaced guide wheels 41 adapted to bear against the surface of the ground in advance of the plow shares 23, said brackets being provided with arcuate rack bars 42, the teeth of which mesh with corresponding pinions 43 carried by a transverse shaft 44 journaled in the side bars of the plow carrying frame 22. The shaft 44 is also provided with a worm wheel 45 which meshes with a worm 46 carried by a vertically disposed post or staff 47, so that by rotating the hand wheel 48 of said staff, the wheels 41 may be raised or lowered so as to regulate the cutting of the plow shares.

It will here be noted that by suspending the hangers 33 from the rear end of the main frame or truck in the manner described, the front end of the plow carrying frame is free to move vertically should the guide wheels 41 enter a rut or hole in the ground during the passage of the machine over a field or other inclosure. It will also be noted that the inner end of the plow carrying frame is free to move vertically on the draw bar or rod 21 so that the member 22 forms in effect a floating frame.

The truck is provided at its forward end with a steering wheel 49 carrying a horizontally disposed fifth-wheel 50, around which is wrapped a cord or cable 51, the latter being connected with a steering rod 52 for the purpose of guiding the machine. A motor 53 is also arranged on the truck and operatively connected through the medium of suitable gearing 54 with the rear wheels 16 of the truck for propelling the latter. The frame construction, fifth-wheel, steering wheel, gearing and propelling mechanism, form the subject matter of a separate application and hence further description thereof is deemed unnecessary.

Attention is here called to the fact that the arched frame or yoke 19 permits vertical adjustment of the plow carrying frame 22 and not only forms a guide and prevents side movement of said plow carrying frame, but also forms in effect a rub iron therefor. It will also be noted that by removing the rod or draw bar 21, the plow carrying frame 22 may be readily detached from the main supporting frame or truck so as to permit said truck to be used for other purposes.

The segmental racks 42 and worm gear 46 not only dispense with the employment of operating levers for adjusting the plow carrying frame, but also allow a better and nicer adjustment of the plow frame with respect to the truck.

Having thus described the invention, what is claimed as new is:

1. In a device of the character described, a wheeled truck, a transverse draw bar mounted on the truck, a plow carrying frame having its inner end provided with arcuate slots for the reception of the draw bar, rollers mounted on the draw bar and bearing against the walls of the slots, guide wheels depending from the plow carrying frame, means for raising and lowering the guide wheels, hangers operatively connected with the outer end of the plow carrying frame, and means for raising and lowering the hangers.

2. In a machine of the character described, a wheeled truck, a transverse draw bar carried by the truck, a plow carrying frame, segmental plates carried by and offset with respect to the frame and having arcuate slots formed therein the walls of which are smooth and adapted to receive the draw bar, rollers carried by the draw bar and bearing against the smooth walls of the arcuate slots, said rollers being provided with flanges bearing against the outer faces of the segmental plates, and means for raising and lowering the plow carrying frame.

3. In a machine of the class described, a wheeled truck, a draw bar extending transversely of the truck at the rear thereof, a plow carrying frame loosely mounted on the draw bar and having its inner end provided with spaced slots adapted to receive the draw bar, the walls of said slots being smooth and unobstructed, guide wheels depending from the side walls of the plow carrying frame near said slots, means for raising and lowering the guide wheels, and means operatively connected with the outer end of the plow carrying frame for raising and lowering the latter.

4. In a machine of the character described, a wheeled truck, a transverse draw bar mounted on the truck, a plow carrying frame having its inner end formed with slots adapted to receive the draw bar, hangers embracing the outer end of the frame and provided with spaced perforations, a shaft journaled on the truck, pins seated in said perforations, terminal arms secured to the shaft and adapted to engage the pins of the hangers, an intermediate arm secured to the shaft, a lever operatively connected with the intermediate arm for raising and lowering the hangers, guide wheels depending from the plow carrying frame, and means operatively connected with the guide wheels for raising and lowering the latter.

5. In a machine of the character described, a main frame including inner and outer sets of longitudinal side bars, spaced yokes interposed between the inner set of side bars, the legs of one yoke being provided with openings, a draw bar seated in said openings, a plow carrying frame having slots formed in the inner end thereof and adapted to receive the draw bar, and means for raising and lowering the outer end of the plow carrying frame, the other yoke embracing the plow carrying frame and constituting a guide therefor.

6. In a machine of the character described, a main frame including longitudinal side bars, a substantially U-shaped yoke interposed between the side bars and having openings formed therein, a draw bar seated in said openings, a plow carrying frame having its inner end provided with spaced slots for the reception of the draw bar, guide wheels depending from the plow carrying frame at the end thereof, means operatively connected with and adapted to raise and lower the guide wheels, and a second yoke embracing the plow carrying frame and provided with oppositely disposed connecting frames secured to the side bars, said second yoke forming a guide and rub iron for the plow carrying frame.

7. In a machine of the character described, a main frame including longitudinal side bars, a yoke interposed between the side bars and provided with transversely alined openings, a draw bar seated in said openings, a plow carrying frame having the inner ends of its side bars offset and provided with plates having arcuate slots formed therein and adapted to receive the draw bar, rollers mounted on the draw bar and engaging the walls of the slots, a second inverted U-shaped yoke secured to the side bars of the main frame and spanning the plow carrying frame, connecting frames secured to the last mentioned yoke and the adjacent side bars of the main frame, said last mentioned yoke forming a guide and rub iron for the plow carrying frame, and means for raising and lowering said plow carrying frame.

8. In a machine of the class described, a main frame including longitudinal side bars, an inverted U-shaped frame connected with the side bars and having transversely alined openings formed therein, a rod seated in said openings and constituting a draw bar, a plow carrying frame including spaced side bars having their inner ends provided with arcuate slots for the reception of the draw bar, and a second inverted U-shaped frame secured to the side bars of the main frame and extending across the top of the plow carrying frame, said last mentioned frame serving to prevent lateral movement of the plow carrying frame.

9. In a machine of the class described, a main frame including longitudinal side bars, spaced yokes secured to the side bars, a draw bar extending transversely through one of the yokes, and a plow carrying frame pivotally connected with and adjustable vertically of the draw bar and having its outer end free to swing within the other yoke.

In testimony whereof, I affix my signature in presence of two witnesses.

HENRY H. BOENKER. [L. S.]

Witnesses:
 LOUIS RINGE,
 LEO ECHELMEIER.

Copies of this patent may be obtained for five cents each, by addressing the "Commissioner of Patents, Washington, D. C."